United States Patent [19]

Cross et al.

[11] Patent Number: 4,819,325
[45] Date of Patent: Apr. 11, 1989

[54] METHOD OF FORMING ELECTRO-DISCHARGE MACHINING ELECTRODE

[75] Inventors: Jack A. Cross, Cincinnati; Cletis M. Jackson, West Chester, both of Ohio

[73] Assignee: Technical Manufacturing Systems, Inc., Mason, Ohio

[21] Appl. No.: 57,120

[22] Filed: Jun. 1, 1987

[51] Int. Cl.⁴ .......................................... H01R 43/00
[52] U.S. Cl. ........................................ 29/825; 29/882
[58] Field of Search .................................. 29/825, 882

[56] References Cited

U.S. PATENT DOCUMENTS

| 3,041,442 | 6/1962 | Ullmann et al. |
| 3,087,043 | 4/1963 | Hofer |
| 3,783,224 | 1/1974 | Sehroeder ................ 29/882 X |
| 3,795,604 | 3/1974 | McKinney et al. |
| 4,197,443 | 4/1980 | Sidenstick |

FOREIGN PATENT DOCUMENTS

| 29461 | 2/1982 | Japan ................................. 29/825 |
| 56267 | 4/1982 | Japan ................................. 29/825 |
| 191067 | 11/1982 | Japan ................................. 29/825 |
| 87071 | 5/1983 | Japan ................................. 29/825 |

Primary Examiner—Carl J. Arbes

[57] ABSTRACT

An improved electrode for producing cone-shaped diffusion openings in the wall of an air-cooled rotor blade of a jet engine or other gas turbine by means of electro-discharge-machining (EDM), is described. The electrode has a needle-like forward end section for forming a round air metering hole, and a cone-like head section which permits the formation of a cone-shaped diffusion opening. The hole and the diffusion opening are formed with a single electrode in one operation. Also described is the method of forming such an electrode by a coining step.

2 Claims, 2 Drawing Sheets

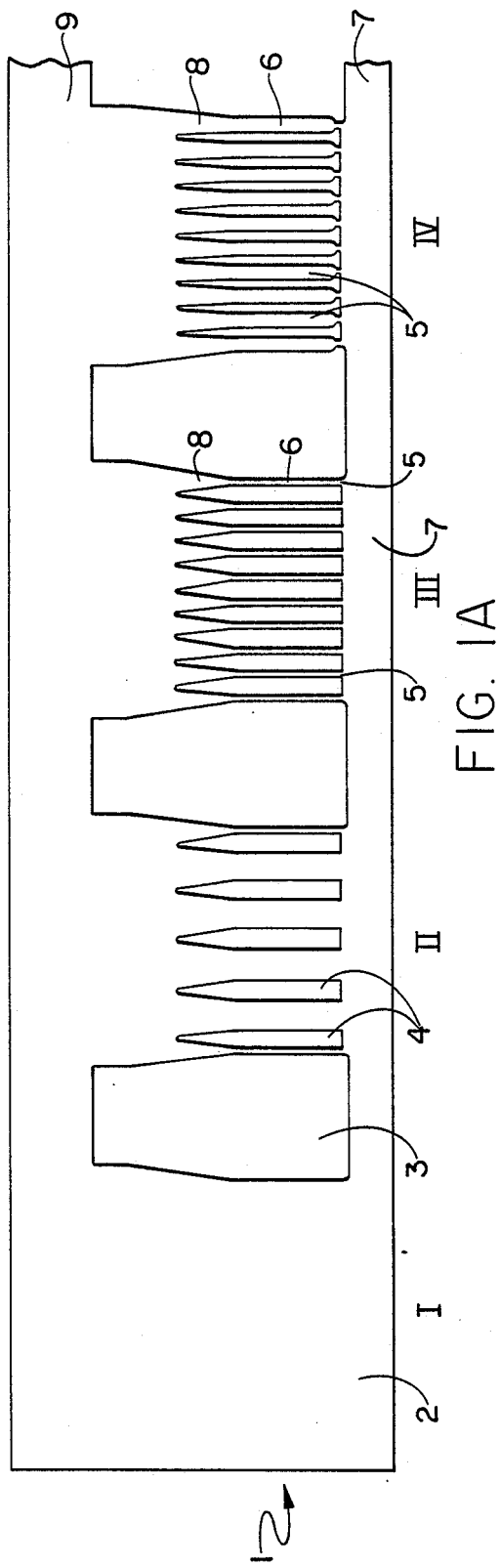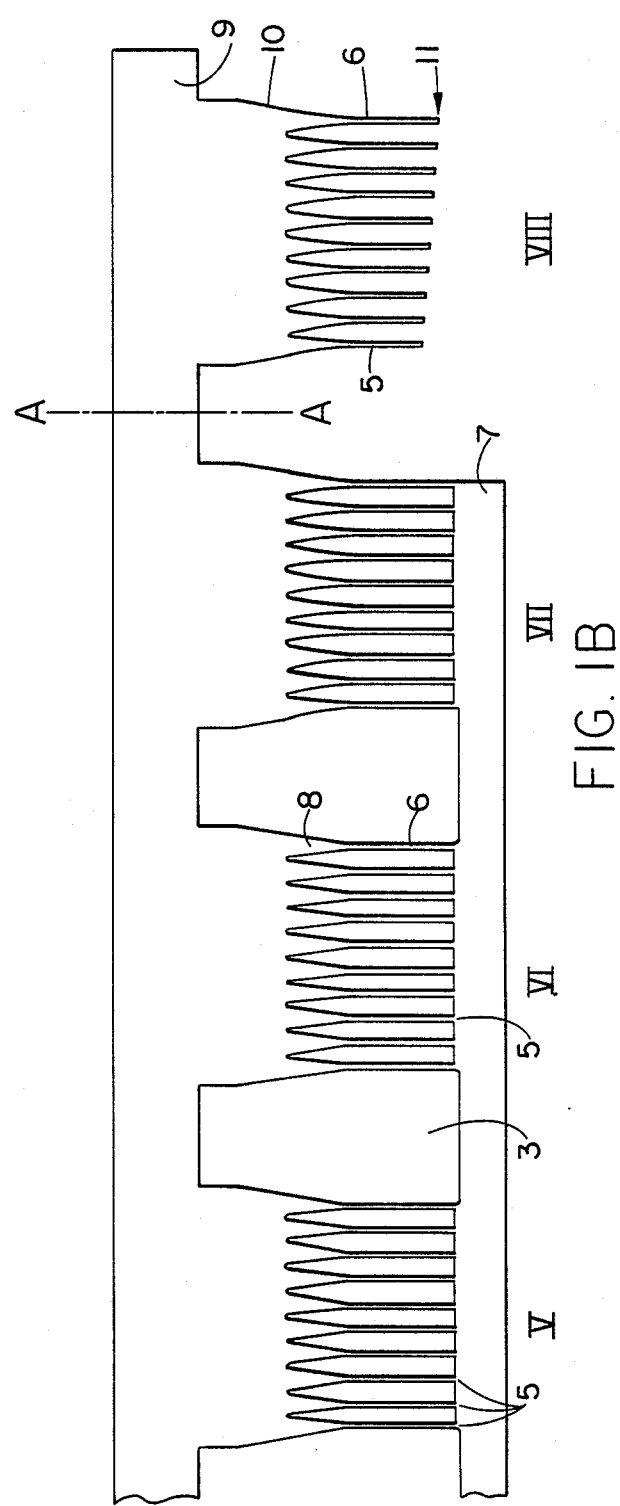

METHOD OF FORMING ELECTRO-DISCHARGE MACHINING ELECTRODE

This invention relates to improved electrodes for producing cone-shaped diffusion openings in the surface of gas cooled turbine components, such as airfoils, by means of electro-discharge machining (EDM) and to the method of forming such electrodes.

BACKGROUND OF THE INVENTION

In gas turbine engines it is now common practise to cool the surface of airfoils, such as the rotor blades, by passing high pressure air or other gas from the turbine compressor through channels in the airfoil and out through small holes in the wall of the airfoil, thereby providing a layer of cooling gas over the airfoil surface. It is also known that the effectiveness of the layer or film of air or other gas in cooling the surface is increased by enlarging the opening of the holes at the surface of the airfoil, such holes with enlarged openings being known as diffusion film holes.

The background of this field of gas cooling of airfoils is described further in U.S. Pat. No. 4,197,443, of J. E. Sidenstick, and in U.S. Pat. No. 3,795,604, of L. J. Mc-Kinney et al.

PRIOR ART

As pointed out by Sidenstick in U.S. Pat. No. 4,197,443, a diffusion hole tapered to an increased opening affords a substantial advantage, but that no suitable method of forming such openings has been developed. A multiple pass process can be used in which a straight hole is formed in one process step and a diffuser portion formed in a second step, but misalignment of the holes is a problem and the two-step process is costly.

Sidenstick's approach is to use a tooth-like electrode of flat material, made with two bends, resulting in an electrode that is longitudinally nonplanar in form. Such an electrode is deficient in that the possible diffusion openings are limited to square, rectangular or trapezoidal shape. The square corners of such shapes induce turbulence and may not permit uniform diffusion of the cooling gas over the turbine component surface especially if the surface of the component has a relatively small radius.

The diffusion of cooling fluid such as air over the surface of an airfoil or other turbine component is enhanced with a cone-like hole with a round, elliptical or similar curve-shaped opening.

Sidenstick's electrode is further limited in that it cannot be used to form holes in the leading edge of an airfoil, as the electrode would form a cut across such an edge rather than a hole through the wall.

In U.S. Pat. No. 3,795,604, L. J. McKinney discloses a method of forming in turbine blades small air holes with a tapered diffuser mouth employing the electrochemical process to electrolytically drill the holes. A two-stage very expensive, short-lived electrode is required.

In U.S. Pat. No. 3,087,043, M. Hofer discloses the forming of spinnerette openings of a certain shape by means of electro-discharge machining using an electrode of the desired shape.

W. Ullmann et al in U.S. Pat. No. 3,041,442 discloses the formation of curved recesses in metal by means of EDM using various shaped electrodes mounted on a pivoted arm.

SUMMARY OF THE INVENTION

The present invention provides a novel electrode for forming, in a single step by EDM, small fluid cooling diffusion holes in the wall of a turbine component, such as an airfoil, as well as a method of producing the novel electrode. We have discovered that an electrode of an electro-conductive material having a straight forward section of substantially circular cross-section and a cone-like head section makes it possible to form in the wall of a fluid cooled turbine component, a cooling hole with a cone-like diffusion opening, all in one operation with one electrode. Previously, such cooling holes with a cone-like diffuser could be formed only in two steps, requiring two separate electrodes. The very substantial advantages of our electrode is obvious.

The term "substantially circular" as used herein covers not only a round or circular cross-section but also elliptical and similar curve-shaped cross-sections.

In the preferred embodiment the novel electrode is a tooth-like unit having a straight leading section which is round, typically 0.005" to 0.030" in diameter which then enlarges progressively into a cone-like shape. In its application in the EDM process, as the electrode is advanced toward and into the workpiece a metering cooling hole is formed through the wall of the workpiece as an image of the straight section and as the electrode is advanced further the mouth of the hole is enlarged to the extent desired as an image of the cone-like portion of the electrode. The cone-like section of the electrode can be an actual cone or can be of elliptical cross-section or can be of other curved shape at its large end. The depth of the cone-like enlargement of the hole is regulated as desired by control of the forward movement of the electrode.

The electrode can be a single tooth with a body section at the cone-like end for securing the electrode in a holder, or can be a number of individual teeth suitably arranged in a holder for a particular EDM application, or can be a comb-like unit of several teeth.

The method of producing the electrode comprises working a thin (for example, 0.020" to 0.050" thick) ribbon of copper or other malleable conductive material in a progressive punch press operation. In the first stage elongated strips are removed transversely of the ribbon to leave a series of spaced teeth extending from a body strip to a base strip. The teeth are narrow for a length at the forward section, which connects to the base strip, and then take on a triangular shape at the head end, which connects with the body strip. In order to reduce the cross-section of the forward section of the teeth, (i.e. the narrow portion), this section is compressed to a desired thickness in the next stage in the punch press operation. Also, each triangular-shaped section is tapered in thickness from its full thickness where it connects to the body strip, to a thickness, at the point of the triangular-shaped section which is equal to that of the forward section of the tooth after it has been compressed. The narrow portions of the teeth, after being compressed, are retrimmed to leave this section of each tooth with an approximately square cross-section and of an area required for the subsequent step of coining into a round cross-section. The forward section of each tooth is then coined into a round needle-like straight member and the triangular shape section is coined into a cone-like shape. The strip of copper is then cut into electrodes which can be individual teeth or can be a comb-like unit comprising a few or many teeth.

With the electrode of the present invention, the cone-like diffusion holes, which provide enhanced cooling film formation, can be readily produced in a one-step operation. Furthermore, our electrode can be used at any angle to the surface of the turbine component and on any part of the surface, whether it be the leading edge, or on a concave surface or on a convex surface.

OBJECT OF THE INVENTION

An object of the invention is to provide an improved electro-discharge machining electrode capable of forming small cooling holes in the wall of a turbine component.

A further object is to provide an improved EDM electrode which overcomes the deficiencies of previously known EDM electrodes.

A further object of the invention is to provide an EDM electrode which is capable of forming, in the wall of a turbine component, cooling metering holes with a round diffusion opening in one operation.

A further object is to provide a method of forming by EDM, small cooling holes with cone-like diffusion openings in turbine components in one step with one electrode.

BRIEF DESCRIPTION OF THE DRAWINGS

FIGS. 1A and 1B present a plan view of a strip of electro-conductive material as it passes through the steps of a progressive punch press to form a multiple-tooth electrode.

DESCRIPTION OF THE PREFERRED EMBODIMENTS

Inasmuch as the formation of cooling holes in airfoils and other gas turbine components by means of electro-discharge machining (EDM) is known technology, having been described by Sidenstick in U.S. Pat. No. 4,197,443 (1980) and formation of various recesses having been described by Ullmann et al in U.S. Pat. No. 3,041,442 (1962), details of the EDM process are not set out herein.

Figure 2:
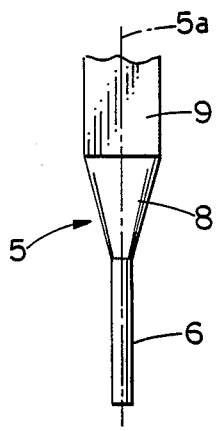
FIG. 2 is an enlarged fragmentary view in side elevation of an embodiment of a single concentric electrode of the present invention.
Figure 5:
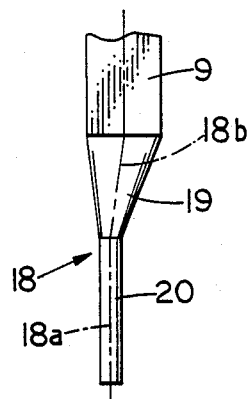
FIG. 5 is an enlarged fragmentary view in side elevation of a single electrode embodiment of the present invention wherein the axis of the cone-like section is non-parallel to the axis of the forward section of the tooth.
Figure 8:
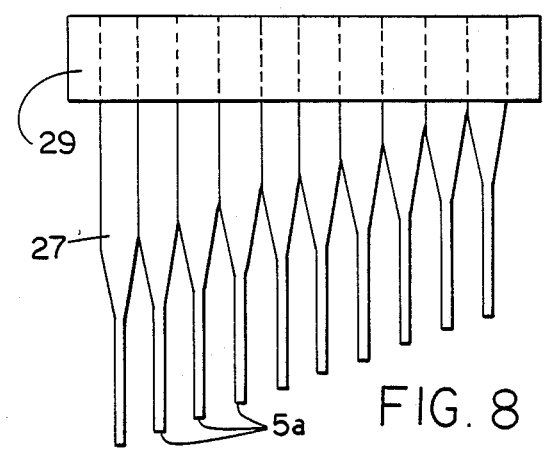
FIG. 8 is a plan view of a multiple-tooth embodiment of the electrode of the present invention in a comb-like arrangement.
Figure 9:
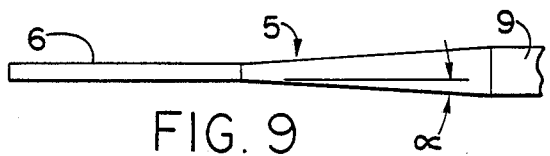
FIG. 9 is an enlarged side view of the single electrode of FIG. 2 or of a single electrode of the comb electrode of FIG. 8.

The electrodes of the present invention can be individual electrodes as shown in FIGS. 2, 5 and 9; normally several of these are mounted in a holder in any desired arrangement for multiple hole formation in the workpiece, as shown in FIG. 8. Also, the electrode can be a multiple-tooth, known as a "comb" as shown in FIG. 1B. The ends of the teeth 5a can be in a straight line, or staggered or otherwise arranged to conform to the contour of the surface of the airfoil.

FIGS. 1A and 1B illustrate the sequential steps in a progressive punch press operation whereby the electrodes of the present invention are formed. In this particular embodiment of the method the electrodes formed are multiple-tooth combs; in the production of combs, a relatively large area is punched out at spaced intervals to leave a suitable size opening 3 between the combs. In production of individual electrodes the size and spacing of the punch openings are different in order to permit cutting of these as separate teeth.

FIGS. 1A and 1B indicate schematically the several steps wherein a strip 1 of a malleable, electro-conductive material, preferably copper, is processed through a progressive punch press operation to form a series of narrow teeth 5. Numeral 2 indicates the solid strip at stage I before the start of the punch press operation. At stage II a large opening 3 has been punched out in order to provide a separation between the combs 10 that are to be cut from the strip at the final step. Elongated strips 4 are punched out of strip 1, normally cut out incrementally in three steps of the progressive punch press operation to form a series of teeth 5 as shown at stage III. Each tooth 5 comprises a narrow forward section 6 connected to base strip 7 and a triangular shaped head section 8 which is connected to body strip 9.

Typically, the thickness of strip 1 is 0.015" to 0.060" in order to provide the necessary stiffness to the body of the electrode and thickness for clamping in the electrode holder. However, the forward section of the completed electrode normally will be from 0.005" to 0.030" in thickness (or diameter) in order to produce the small cooling holes of the size specified for the turbine component. Furthermore, as previously pointed out, the enhanced cooling effect is obtained with cone-like openings at the surface of the turbine component.

We have found that our electrode can be produced economically and readily by the following additional steps in a progressive punch press operation. By means of a suitable die, the forward section 6 of each tooth 5 is compressed to a desired thickness, depending upon the specified final cross-section of the tooth; typically for a round tooth the final diameter of the forward section of the electrode is in the range of 0.005" to 0.030". Also, the triangular-shaped head section 8 is tapered in thickness in the compression step; the point of the triangular section 8 after compression will be the same thickness as the forward section 6 of the tooth 5, whereas the base of the triangular section 8 will remain unchanged in thickness. That is, the thickness of the base of the triangular head section remains the same as that of the body strip 9. The teeth 5 after the compression step are as indicated in stage IV.

In the next step in the progressive punch press operation the compressed, that is, flattened forward section 6 of each tooth 5 is retrimmed to reduce the width of each tooth, as indicated at Stage V. The thickness and width of each tooth 5 at this stage is such as to provide the desired cross-sectional area of the forward section 6 of each tooth for the final forming step. The cross-section at this stage may be substantially square or rectangular.

In the next step the forward section 6 of each tooth 5 is subjected to a coining operation wherein the forward section 6 of the tooth is compressed into a round shape along its length. Alternatively, the forward section of the tooth can be coined into an elliptical or other cross-sectional shape. The electrodes are in one of such shapes at stage VI.

In the final forming step the triangular-shaped head section 8 of each tooth 5 is coined into a cone-like shape. The cone-like shape can be a conventional cone, that is, with a circular base or can have an elliptical base or other curve-shaped base. The strip 2 will now have the appearance of that shown in stage VII.

Electrodes are then cut from the strip 2 such as along the line A—A of FIG. 1B to produce a comb electrode 10 which includes body strip 9. In the trimming the base strip 7 is removed and the ends of the electrodes are cut along line 11 as required by the geometry of the component to be drilled, the result being as indicated at stage VIII.

Individual electrodes 5 as shown in FIGS. 2 and 5 are formed by the same progressive punch press steps from a strip of copper or other malleable electro-conductive material as employed in producing comb electrodes. However, the spacing of the teeth formed in the strip will be different from that for the comb. In FIGS. 2 and 5 the angle of the cone-like section is exaggerated to facilitate the explanation of the electrodes.

Figure 3:
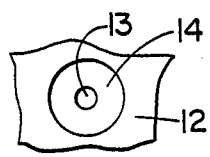
FIG. 3 is a fragmentary plan view of the resulting cooling hole where the electrode of FIG. 2 is of circular cross-section.
Figure 4:
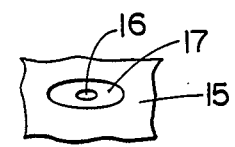
FIG. 4 is a fragmentary plan view of the resulting cooling hole formed where the electrode of FIG. 2 is of elliptical cross-section.

FIG. 2 illustrates a single tooth electrode of circular cross-section. FIG. 3 illustrates in cross-section the hole formed in the turbine component when employing this electrode. A round cooling metering hole 13 is formed together with a cone-shaped diffusion opening 14 in the wall 12. FIG. 4 illustrates the elliptical metering hole 16 and elliptical-shaped diffusion opening formed where the electrode 5 is elliptical in cross-section.

Figure 6:
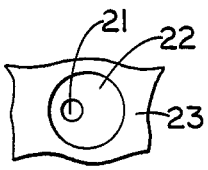
FIG. 6 is a fragmentary plan view of the resulting cooling hole where the electrode of FIG. 5 is of circular cross-section.
Figure 7:
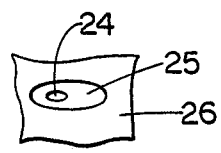
FIG. 7 is a fragmentary plan view of the resulting cooling hole where the electrode of FIG. 5 is of elliptical cross-section.
Figure 12:
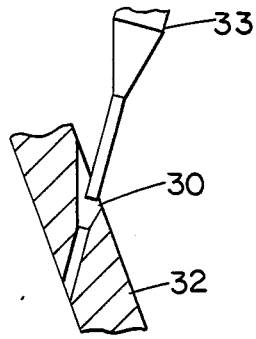
FIG. 12 is a fragmentary cross-sectional view of the leading edge of an airfoil and cooling hole as formed in FIG. 11.

The electrode of our invention is not limited to that of the cone-shaped section being concentric with the forward section. FIG. 5 illustrates an electrode 18 wherein the axis 18b of the cone-like section 19 is not aligned with the axis 18a of the forward section 20. FIG. 6 illustrates in cross-section the cooling gas metering hole 21 and off-center diffusion opening 22 formed in wall 23 of a gas turbine component with electrode 18, where the electrode is circular in cross-section. FIG. 7 illustrates in cross-section the metering hole 24 and diffusion opening 25 formed in wall 26 where electrode 18 is elliptical in cross-section.

Our method of forming makes it possible to form EDM electrodes of various combinations of shapes. For example, the forward section can be of circular cross-section and the cone-like section can be of elliptical cross-section and/or can be tilted. Our electrode consequently offers greater versatility in design of the pattern of cooling holes in turbine components.

FIG. 8 illustrates an arrangement 27 of individual electrodes 5 (or 18) mounted in a holder 29 in a staggered manner as required in order for the ends 5a to conform to a particular contour of a turbine component.

FIG. 9 shows the typical shape of the electrode 5 of our invention. The forward section 6 is a straight section substantially circular in cross-section and in the range of 0.005" to 0.030" in thickness. The angle $\alpha$ between the wall of the cone-like section and the axis of the electrode can be any angle up to 40° but preferably is from 2° to 10°.

Figure 10:
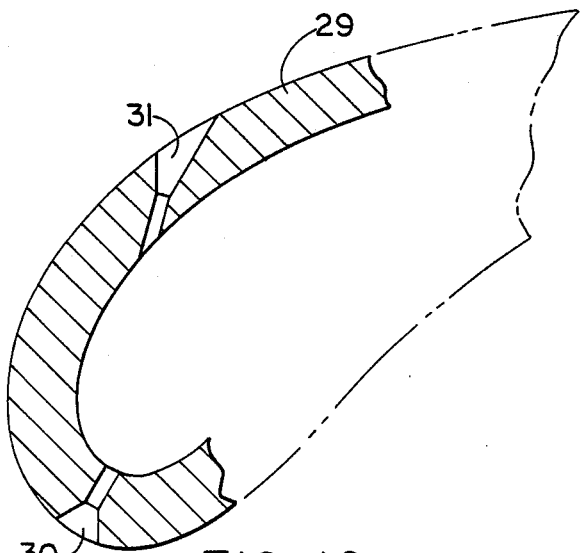
FIG. 10 is a fragmentary cross-sectional view of the wall of the leading edge of an airfoil with cone-like cooling holes formed with an electrode of the present invention.

FIG. 10 illustrates that with our electrode the cooling holes can be formed in the surface of any contour of the turbine component, even the leading edge of the airfoil. Thus, hole 30 can be formed at any angle on the leading edge of airfoil 29. This is a significant advantage over the prior art electrodes.

Figure 11:
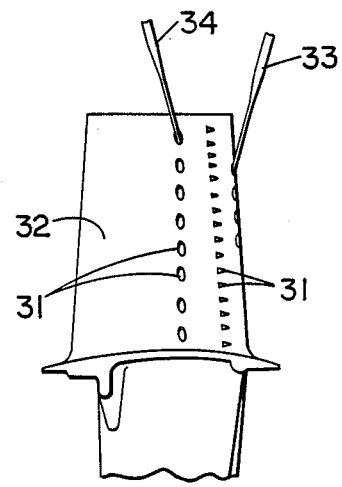
FIG. 11 is a fragmentary elevation view of a gas turbine airfoil illustrating one angle of application of an electrode of the present invention.

FIG. 11 illustrates the case of formation of cooling holes in the wall of airfoil 32, where the electrodes are directed more or less axially to the airfoil. Electrode 33 will form a diffusion opening 30 whereas electrode 34 will form diffusion openings 31.

The electrode of our invention provides wide versatility making it possible to meet the requirements of the design engineers in designing gas turbine engines. The holes can be formed in the wall of the turbine component in virtually any contour, at any angle to the wall, with cone-like openings set at various angles and formed to any desired depth.

The term "turbine component" as used herein includes not only airfoils but also combusters, shrouds, seals, supports and other cooled parts. The cooling media is not limited to air but includes other gases such as nitrogen and other fluids.

What is claimed is:

1. A method of forming, from a thin ribbon of malleable electro-conductive material, an electrode for use in electro-discharge machining, said electrode having at least one tooth, each said tooth having a straight forward section, the cross-section of said forward section being substantially circular, and a cone-like head section diverging from said forward section and being connected to a body section, which comprises the steps of:
    removing elongated sections of said material from said ribbon transverse to the length of said ribbon to leave a series of spaced teeth extending between a body strip and a base strip,
        said teeth being narrow for a length at the forward section which connects with said base strip, and being triangular-shape at the head section which connects with the said body strip,
    compressing said teeth to reduce the thickness of said forward section to a desired thickness and to taper the thickness of said triangular-shape head section from the full thickness where it connects with said body strip to the compressed thickness of said forward section,
    trimming said teeth to a desired width along said forward section,
    coining said forward section of said teeth to a substantially circular cross-section shape,
    coining said head section of said teeth to a cone-like shape, and
    cutting electrodes from said ribbon.

2. A method of forming, from a thin strip of malleable electro-conductive material, an electrode for use in producing a cone-like cooling hole in the surface of a turbine component by means of electro-discharge-machining, which comprises forming in said strip one or more teeth each comprising a straight forward section and a triangular shaped head section connected to a body section and coining said forward section into a substantially circular cross-section and coining said triangular head section into a cone-like section.

* * * * *